Aug. 26, 1958  H. JANSEN  2,849,043
SAUSAGE MEAT CUTTER KNIFE
Filed Dec. 7, 1955  2 Sheets-Sheet 1
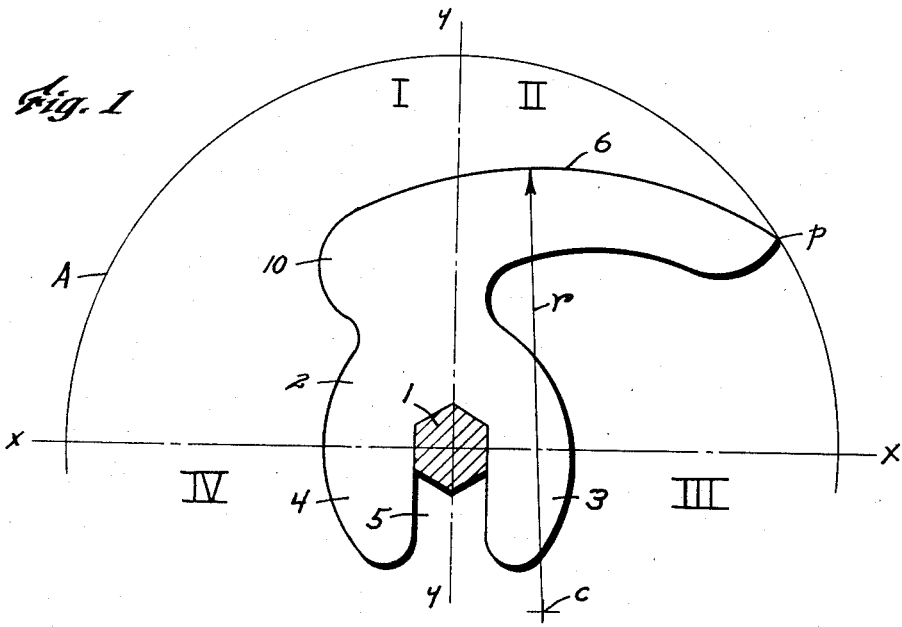
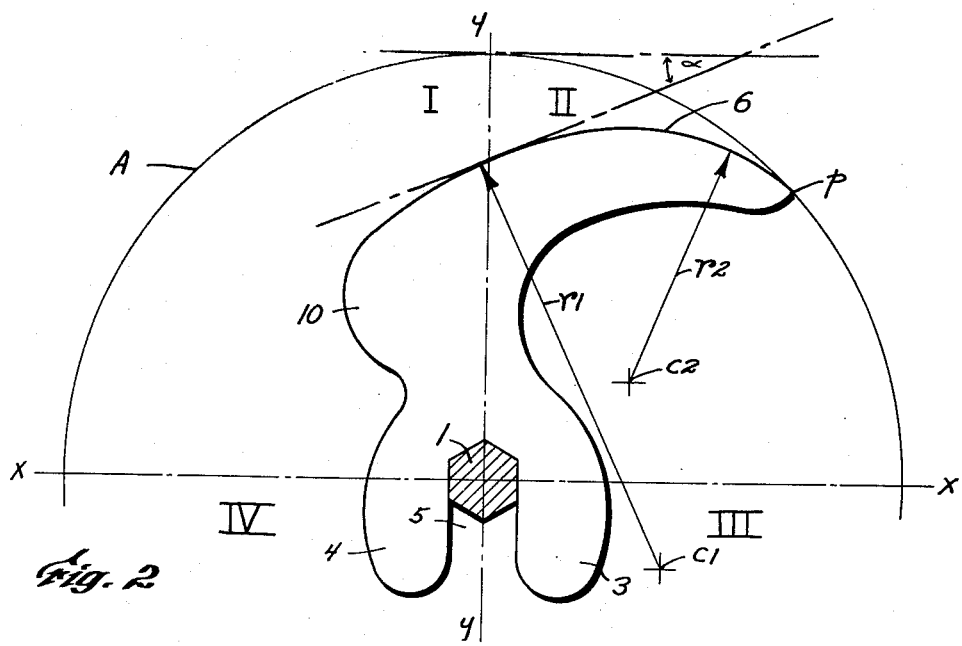
HANS JANSEN
Inventor
by Porter, Chittick, & Russell
Attorneys

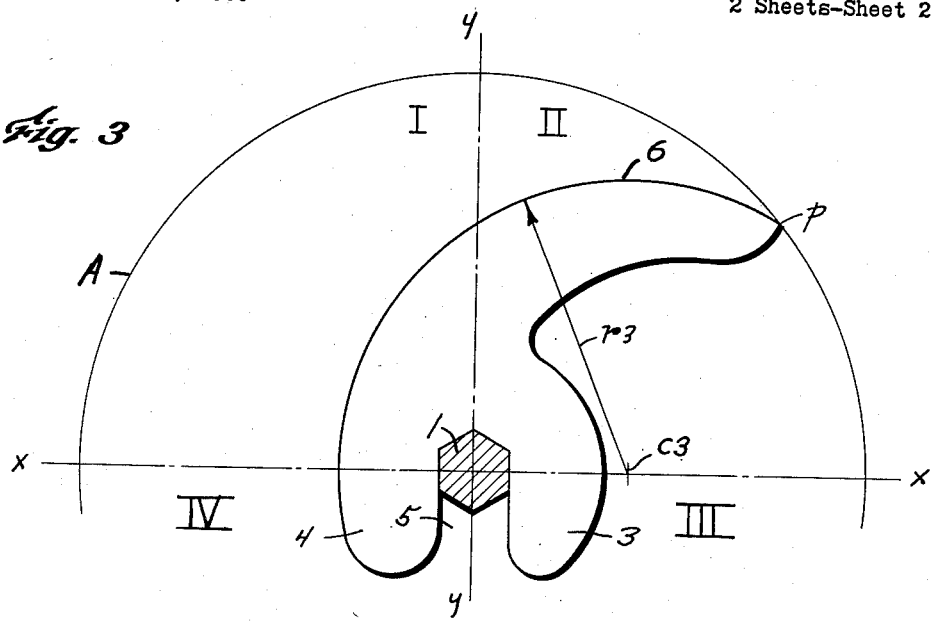
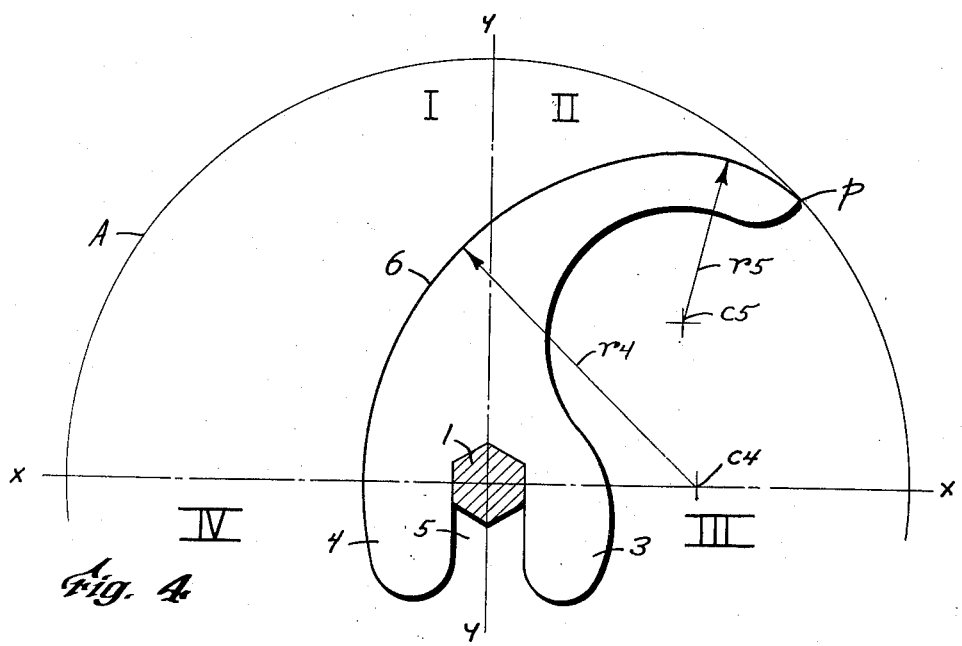

United States Patent Office 2,849,043
Patented Aug. 26, 1958

2,849,043

SAUSAGE MEAT CUTTER KNIFE

Hans Jansen, Hildesheim, Germany

Application December 7, 1955, Serial No. 551,624

7 Claims. (Cl. 146—106)

This invention relates to improvements in cutter-knives of the type arranged in sets, usually of three or more, on the knife shaft of a cutter adjacent the wall of a cutter dish.

Heretofore, it has been the practice to mince meat for scalding sausages by means of knife cutters and to process the meat for raw sausages by means of choppers. While the practice with respect to scalding sausages is fairly satisfactory, the use of choppers to process meat for raw sausages has a disadvantage in that the meat is crushed, resulting in undesired destruction of the albumen cells of the meat and reducing the durability of the sausage. On the other hand, even worse results have been obtained by using cutters to mince the meat for raw sausages. Some attempts have been made to improve the operation of cutter-knives so that they may be used satisfactorily in processing meat for raw sausage, but they have not been successful.

Accordingly, it is the object of this invention to provide cutter knives of such shape that they can be effectively used to process meat for raw sausages as well as scalding sausages without the usual disadvantageous results.

A further object of this invention is to provide a cutter-knife whose cutting edge runs in a curved line outwardly from its axis of rotation and approaches the circle described by its point at a mean tangent angle of approximately more than 10 degrees.

A more specific object of the invention is to provide a cutter-knife whose cutting edge extends into two quadrants of the circle described by its point with the center or axis of the radius of curvature of the cutting edge being eccentric to the axis of rotation of the cutter-knife in the same quadrant instantaneously occupied by the point or in a third quadrant adjacent to said same quadrant.

Still another specific object is to provide a cutter-knife having a curved cutting edge determined by two radii of different length having different axes or centers each eccentric to the axis of rotation of the cutter-knife.

Other objects and many of the attendant advantages of this invention will be readily appreciated as the same becomes better understood by reference to the following detailed description when considered in connection with the accompanying drawings, wherein:

Fig. 1 is a schematic representation of one embodiment of a cutter knife constructed according to the present invention;

Fig. 2 is a schematic representation of a second form of cutter knife;

Fig. 3 is a schematic representation of a third form of cutter knife; and

Fig. 4 is a schematic representation of a fourth form of cutter knife.

Before explaining in detail the construction of the several forms of cutter-knives shown in the drawings it is to be noted that part of the circle described by the point of the various cutter knives as they rotate is represented by the circular arc identified as A. In each figure the circle is divided by axes X—X and Y—Y into four quadrants I, II, III, and IV, arranged in consecutive order in clockwise fashion, starting with the top left hand quadrant, I. The same numbers are used in the several figures to identify similar elements.

Referring now to Fig. 1, there is shown a cutter-knife 2 provided with legs 3 and 4 defining a slot 5 for accommodating an hexagonally shaped knife shaft 1. The inside surfaces of legs 3 and 4 seat snugly against opposite sides of shaft 1 so that they will rotate with shaft 1. Several knives may be and usually are mounted on such a knife shaft. It is to be understood that the knives are secured to the knife shaft by suitable means (not shown) in the customary manner. If desired the knife-cutter may be manufactured with a polygonally-shaped hole in place of slot 5 without departing from the invention since the improvement resides in the knife edge. In Fig. 1, as in the other figures, the cutter knife is momentarily positioned with its legs disposed parallel to axis Y—Y.

The operative part of the knife, the cutting edge 6, is curved outwardly from the shaft to the cutter dish (not shown). In accordance with this invention the cutting edge 6 of the embodiment of Fig. 1 is in two quandrants as, for example, I and II, and has a constant radius $r$ which, suitable for the purposes of the invention, corresponds substantially to the radius of the dish of the cutter on which the knife is to be mounted. In this case cutting edge 6 starts in the first quadrant as curved head 10 and terminates at point $p$ in the second quandrant. In the case of the symmetrically arranged knife shaft 1 the radius of the dish is only slightly larger than the circle A described by the point $p$ of the knife as it moves along the wall of the dish. The intermediate space can be less than 1 mm. The center point $c$ of radius $r$, that is, the center of curvature of cutting edge 6, is displaced from the axis or center of shaft 1 by a distance equal $\tfrac{1}{3}r$. The distance of a perpendicular to axis X from center point $c$ is equal to $\tfrac{1}{4}r$. The cutting edge 6 of Fig. 1, as well as the cutting edges illustrated in Figs. 2, 3, and 4, approaches the circle A described by the knife point at a mean or average tangent angle $\alpha$ of approximately more than 10°. The tangent angle, as indicated in Fig. 2, is the angle between a line tangent to the cutting edge of the knife and a line tangent to the circle described by the tip of the knife as it rotates where both points of tangency occur in a common radius of the circle. Fig. 2 illustrates the tangent angle of a point on the knife edge that coincides with the line Y—Y. The tangent angle for any other selected point on the knife edge can be determined by first drawing a line tangent to the knife edge at said any other selected point, then drawing a radial line from the center of said circle through said any other selected point, and finally drawing a line tangent to said circle where said radial line intersects said circle. The angle of intersection of the two tangent lines is the tangent angle of said any other selected point. The mean tangent angle is the average tangent angle of successive points on the knife edge.

In the case of the embodiment illustrated in Fig. 2, cutting edge 6 commences in the first quadrant as curved head 10 and terminates at point $p$ in the second quadrant. For instance, the curved line of cutting edge 6 has two different radii $r$ and $r2$, the length of which decreases in the direction of the knife point. The position of the two centers of curvature is determined by the horizontal distances from axis of knife shaft 1 and the vertical distance to horizontal axis X. In the present case the center $c1$ of radius $r1$ is located in quadrant III and the center $c2$ of radius $r2$ is located in quadrant II.

In Fig. 3 the cutting edge 6 commences approximately at axis X, extends clockwise through quadrant I into and terminates in a point $p$ in quadrant II. The cutting edge in Fig. 3 is similar to the cutting edge in Fig. 1 in that it has only one radius of curvature $r3$. In this case, however, the center $c3$ of radius $r3$ is located slightly above axis X between quadrants II and III.

In Fig. 4, as in Fig. 3, the cutting edge commences approximately at axis X, extends through quadrant I and terminates at a point $p$ in quadrant II. This fourth form of the invention is similar to the embodiment of Fig. 2 in that the cutting edge has different, for instance, two different radii of curvature, $r4$ and $r5$, the length of which decreases in the direction of the knife point $p$. The center $c4$ of radius $r4$ is located approximately at axis X between quadrants II and III and the center $c5$ of radius $r5$ is located in quadrant II.

In each form of the invention the centers of curvature of the knife edges are located eccentric to the axis of knife shaft 1. Moreover, in each case the knife edge approaches the circle described by the point $p$ of the knife at a mean tangent angle of approximately more than 10°. Due to the above described formation or curvature of the knife edge, shortening of the attacking cut is obtained, thereby avoiding a pure chopping cut and eliminating disadvantageous destruction and crushing of the meat. The draw cut produced by the cutter-knives provided according to the present invention makes possible an effective operative cutting length of 150–200% of the momentary dish radius, which is considerably higher than that heretofore achieved by other knives of known shape. Using knives of the type illustrated in Figs. 1–4 it is possible not only to satisfactorily process meat mixture for raw sausage, but also to provide a better meat mixture for scalding sausages.

Obviously many modifications and variations of the present invention are possible in the light of the above teachings. Therefore, it is to be understood that the invention is not limited in its application to the details of construction and arrangement of parts specifically described or illustrated, and that within thet scope of the appended claims it may be practised otherwise than as specifically described or illustrated.

I claim:

1. A cutter knife for use in sausage meat processing machinery fixed to a rotary axis by a slot and having a cutting edge curving outwardly from its axis of rotation, in which cutter knife the cutting edge is disposed to the right and left of a line passing through the center of said slot and extends into first and second consecutive quadrants of the circle described by its tip with the tip disposed in the second quadrant, said cutting edge commencing at a point spaced from said axis of rotation, consecutive points along said cutting edge approaching the said circle gradually at an average tangent angle of approximately more than 10°, said tangent angle being the angle formed between a line tangent to the cutting edge of the knife and a line tangent to the said circle with both lines of tangency being located on a common radius of said circle.

2. A cutter knife as defined by claim 1 wherein said cutting edge has a portion, the center of curvature of which is in said second quadrant.

3. A cutter knife as defined by claim 1 wherein a portion of said cutting edge has a center of curvature in a third quadrant.

4. A cutter knife as defined by claim 1 wherein said cutting edge has two portions having two distinct centers of curvature, one of which is located in said second quadrant.

5. A cutter knife as defined by claim 1 wherein said cutting edge has a single center of curvature.

6. A cutter knife as defined by claim 1 wherein said cutting edge has a single center of curvature located on a line extending through said rotary axis at right angles to the center line of said slot.

7. A cutter knife as defined by claim 1 wherein said cutting edge has a center of curvature located on a line extending through said rotary axis at right angles to the center line of said slot.

References Cited in the file of this patent

UNITED STATES PATENTS

| | | |
|---|---|---|
| 328,641 | Billingham | Oct. 20, 1885 |
| 1,069,485 | Smith | Aug. 5, 1913 |
| 1,583,755 | Schmidt | May 4, 1926 |
| 1,655,785 | Guelden | Jan. 10, 1928 |
| 1,744,597 | Vasconcellos | Jan. 21, 1930 |
| 2,721,593 | Schaller | Oct. 25, 1955 |

FOREIGN PATENTS

| | | |
|---|---|---|
| 589,610 | France | Feb. 25, 1925 |
| 105,965 | Sweden | Nov. 17, 1942 |
| 302,137 | Switzerland | Dec. 16, 1954 |